US012735591B2

(12) United States Patent
Komatsu et al.

(10) Patent No.: US 12,735,591 B2
(45) Date of Patent: Sep. 15, 2026

(54) INK COMPOSITION FOR INK JET PRINTING

(71) Applicant: SEIKO EPSON CORPORATION, Tokyo (JP)

(72) Inventors: Hidehiko Komatsu, Chino (JP); Yasuhiro Oki, Matsumoto (JP); Shintaro Hama, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 519 days.

(21) Appl. No.: 18/489,054

(22) Filed: Oct. 18, 2023

(65) Prior Publication Data

US 2024/0150601 A1 May 9, 2024

(30) Foreign Application Priority Data

Oct. 19, 2022 (JP) ................................ 2022-167405

(51) Int. Cl.

*C09D 11/328* (2014.01)
*C09B 35/023* (2006.01)
*C09B 35/037* (2006.01)
*C09B 67/20* (2006.01)
*C09B 67/22* (2006.01)
*C09D 11/033* (2014.01)
*C09D 11/037* (2014.01)

(52) U.S. Cl.

CPC .......... *C09D 11/328* (2013.01); *C09B 35/023* (2013.01); *C09B 35/037* (2013.01); *C09B 67/0058* (2013.01); *C09B 67/0069* (2013.01); *C09D 11/033* (2013.01); *C09D 11/037* (2013.01)

(58) Field of Classification Search

CPC ... C09D 11/328; C09D 11/033; C09D 11/037; C09D 11/38; C09D 11/40; C09D 11/54; C09D 11/36; C09B 35/023; C09B 35/037; C09B 67/0058; C09B 67/0069; D06P 5/30

See application file for complete search history.

(56) References Cited

FOREIGN PATENT DOCUMENTS

| | | | | |
|---|---|---|---|---|
| CN | 101177545 | A | * | 5/2008 |
| JP | 2005-089480 | A | | 4/2005 |
| JP | 2014-162863 | A | | 9/2014 |
| JP | 2015117297 | A | * | 6/2015 |
| JP | 2017036364 | A | * | 2/2017 |

OTHER PUBLICATIONS

English machine translation of JP-2017036364-A (Year: 2017).*
English machine translation of JP-2015117297-A (Year: 2015).*
English machine translation of CN-101177545-A (Year: 2008).*

* cited by examiner

*Primary Examiner* — Amber R Orlando
*Assistant Examiner* — Jeffrey Eugene Barzach
(74) *Attorney, Agent, or Firm* — Harness, Dickey & Pierce, P.L.C.

(57) ABSTRACT

Provided is an ink composition for ink jet printing containing a coloring material, a water-soluble organic solvent, and water. The coloring material contains a compound A represented by Formula (1) and a compound B represented by Formula (2) and a mass ratio (a/b) of a content a of the compound A to a content b of the compound B is 1.0 or more and 99 or less.

6 Claims, 1 Drawing Sheet

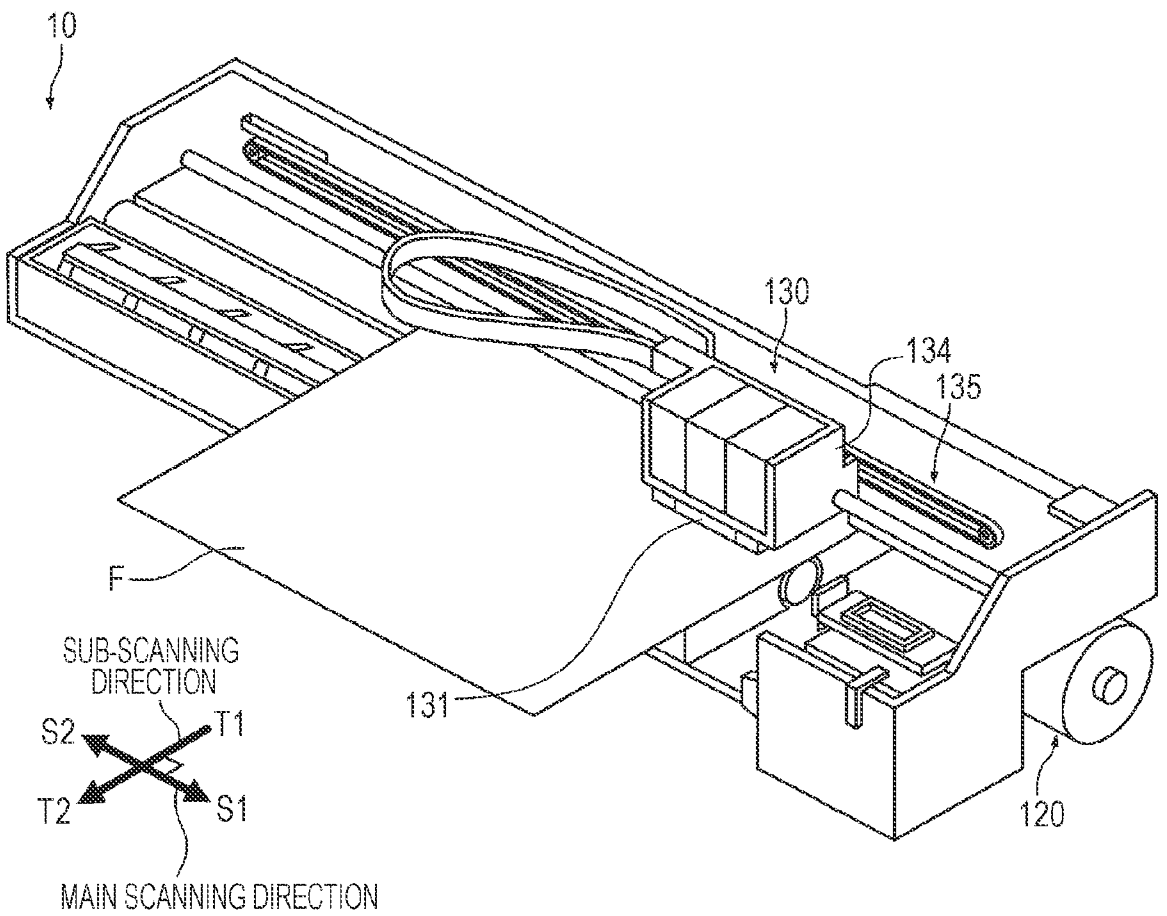
10
130
134
135
F
SUB-SCANNING
DIRECTION
S2
T1
T2
S1
MAIN SCANNING DIRECTION
131
120

INK COMPOSITION FOR INK JET PRINTING

The present application is based on, and claims priority from JP Application Ser. No. 2022-167405, filed Oct. 19, 2022, the disclosure of which is hereby incorporated by reference herein in its entirety.

BACKGROUND

1. Technical Field

The present disclosure relates to an ink composition for ink jet printing.

2. Related Art

The ink jet recording method enables high-precision image recording by a relatively simple apparatus and is thus being rapidly developed in various fields. Given these circumstances, various studies have been conducted on color developing properties and ejection stability. For example, JP-A-2014-162863 discloses an ink for ink jet recording containing C.I. Acid Orange 33 as a coloring agent. For the purpose of providing an ink for ink jet recording having excellent ejection reliability involving less nozzle clogging and less injection deflection and the like, the ink for ink jet recording contains C.I. Acid Orange 33 as a coloring agent having at least two peaks when being developed by liquid chromatography and having a ratio S2/S1 of a low-polarity second peak area S2 to a high-polarity first peak area S1 of less than 0.90.

It has been revealed that it is difficult for the ink composition containing C.I. Acid Orange 33 described in JP-A-2014-162863 to achieve both water resistance and clogging reliability.

SUMMARY

The ink composition for ink jet printing of the present disclosure contains a coloring material, a water-soluble organic solvent, and water. The coloring material contains a compound A represented by Formula (1) and a compound B represented by Formula (2) and a mass ratio (a/b) of a content a of the compound A to a content b of the compound B is 1.0 or more and 99 or less:

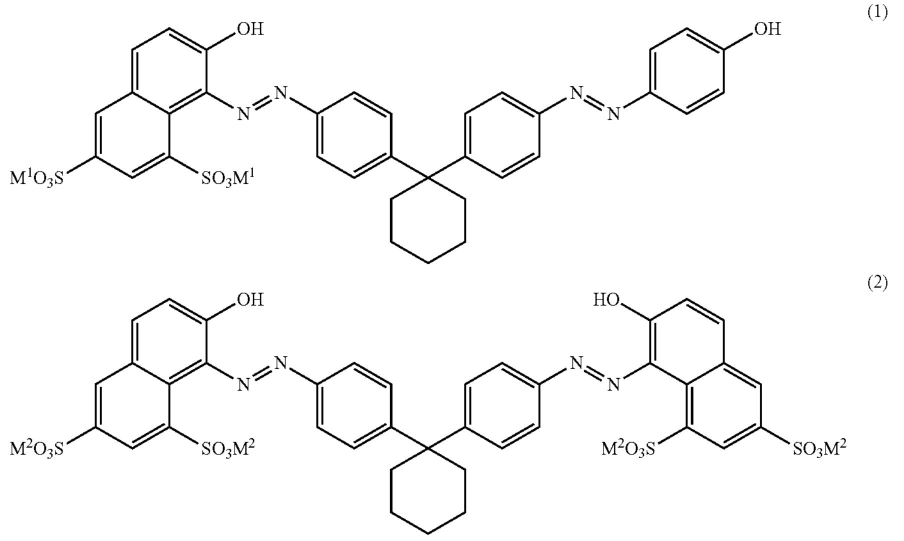

(1)

(2)

wherein $M^1$ each independently indicate Li, Na, K, or $NH_4$ and $M^2$ each independently indicate Li, Na, K, or $NH_4$.

BRIEF DESCRIPTION OF THE DRAWINGS

FIGURE is a diagram of an example of a recording apparatus used when recording is performed using a composition of the present embodiment.

DESCRIPTION OF EMBODIMENTS

The following specifically describes an embodiment of the present disclosure (hereinafter, referred to as a "present embodiment") in detail with reference to the drawing as needed, but the present disclosure is not limited to this example, and various modifications can be made without departing from the gist thereof. In the drawing, the same components are denoted by the same symbols, with any duplicate description omitted. The positional relation such as up and down and left and right is based on the positional relation illustrated in the drawing unless otherwise specified. In addition, the dimensional ratio in the drawing is not limited to the ratio illustrated in the drawing.

1. Ink Composition for Ink Jet Printing

The ink composition for ink jet printing according to the present embodiment (hereinafter, also referred to simply as an "ink composition" or an "ink composition for printing") contains a coloring material, a water-soluble organic solvent, and water. The coloring material contains a compound A represented by Formula (1) and a compound B represented by Formula (2) and a mass ratio (a/b) of a content a of the compound A to a content b of the compound B is 1.0 or more and 99 or less:

(1)

(2)

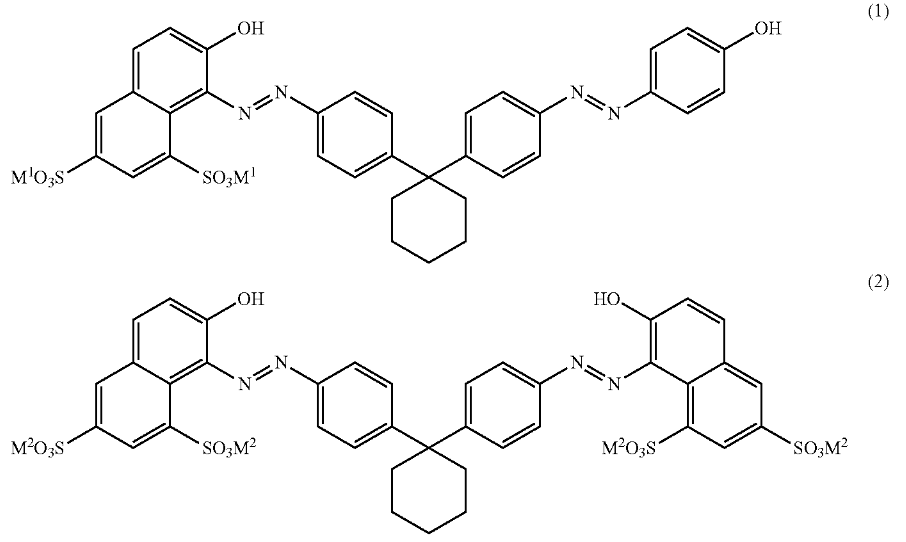

wherein $M^1$ each independently indicate Li, Na, K, or $NH_4$ and $M^2$ each independently indicate Li, Na, K, or $NH_4$.

The compound A represented by Formula (1) (hereinafter, also referred to simply as a "compound A") has been used as an orange coloring material. By using an ink composition containing such a compound A, recorded products having good lightfastness, water resistance, and the like can be obtained. However, when using the ink composition containing the compound A, there arises a problem in that nozzles of an ink jet head are likely to clog. It has been difficult to achieve both water resistance and clogging reliability, which tend to be a tradeoff.

Given these circumstances, the inventors of the present disclosure have conducted earnest study in order to solve the above problem to prepare an ink composition excellent in both water resistance and clogging reliability by containing the compound A and the compound B represented by Formula (2) (hereinafter, also referred to simply as a "compound B") as the coloring material and adjusting the content of the compound B to a certain amount.

The ink composition of the present embodiment can be used as an ink composition showing orange and may be used alone or mixed with ink compositions showing other colors. The following describes the ink composition of the present disclosure in detail.

1.1. Coloring Material

The ink composition of the present embodiment contains the compound A represented by Formula (1) and the compound B represented by Formula (2) as the coloring material. The mass ratio (a/b) of the content a of the compound A to the content b of the compound B is 1.0 or more and 99 or less. By adjusting the contents of the compound A and the compound B to the above range, both the water resistance and the clogging reliability of the ink composition can be achieved. From the same point of view, the mass ratio (a/b) is preferably 1.0 or more and 60 or less, 1.0 or more and 30 or less, 1.0 or more and 10 or less, 1.0 or more and 5.0 or less, 1.0 or more and 2.7 or less, 1.0 or more and 2.3 or less, and 1.0 or more and 1.9 or less. The coloring material may contain compounds or the like other than the compound A and the compound B.

The content of the coloring material is, for example, 1.0% by mass or more and 15% by mass or less with respect to the total amount of the ink composition. From the viewpoint of producing the effect of the present disclosure more surely, the content of the coloring material is preferably 2.0% by mass or more and 12.5% by mass or less and more preferably 3.0% by mass or more and 10% by mass or less with respect to the total amount of the ink composition.

In the purification of the compounds for use in the coloring material, a reverse osmosis membrane purification method, a gel permeation chromatography purification method, or a preparative high-performance liquid chromatography purification method can be further used as needed.

1.1.1. Compound A of Formula (1)

The ink composition contains the compounds A represented by Formula (1). The compound A is a coloring material showing orange.

(1)

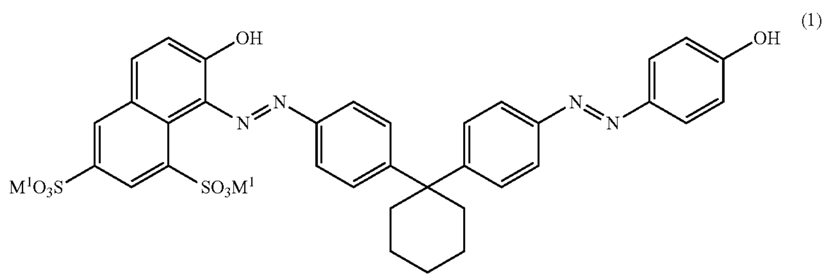

wherein $M^1$ each independently indicate Li, Na, K, or $NH_4$.

The content a of the compound A is preferably 0.5% by mass or more and 12.5% by mass or less, more preferably 1.0% by mass or more and 10% by mass or less, even more preferably 1.5% by mass or more and 7.5% by mass or less, and still even more preferably 2.0% by mass or more and 5.0% by mass or less with respect to the total amount of the ink composition. The content of the compound A being within the above range shows a tendency to improve the water resistance of a recorded product to be obtained and the clogging reliability of the ink composition.

1.1.2. Compound B of Formula (2)

The ink composition contains the compound B represented by Formula (2):

(2)

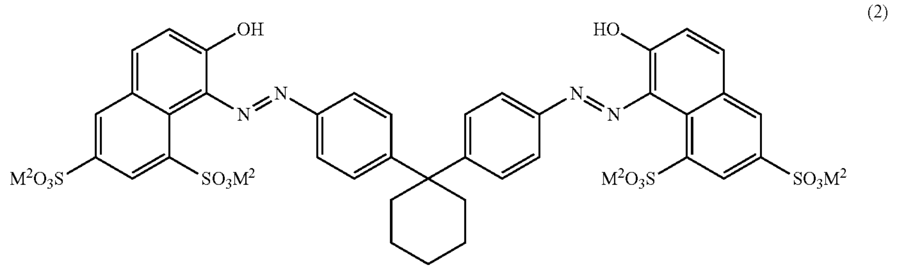

wherein $M^2$ each independently indicate Li, Na, K, or $NH_4$.

The content b of the compound B is preferably 0.01% by mass or more and 10% by mass or less, more preferably 0.05% by mass or more and 8.0% by mass or less, even more preferably 0.08% by mass or more and 6.0% by mass or less, and still even more preferably 0.1% by mass or more and 4.0% by mass or less with respect to the total amount of the ink composition. The content of the compound B being within the above range shows a tendency to improve the water resistance of a recorded product to be obtained and the clogging reliability of the ink composition.

1.1.3 Compound C of Formula (3)

The ink composition of the present embodiment preferably contains a compound C represented by Formula (3) (hereinafter, also referred to simply as a "compound C"). The compound C being contained shows a tendency to reduce metamerism of a recorded product to be obtained. Metamerism in general refers to a phenomenon in which two colors different in spectroscopic distribution look the same color under a certain illumination condition or the like but these two colors look different colors when the illumination condition or the like is changed.

For example, a D50 light source or illumination using D65 is a light source having gentle wavelength distribution close to that of daytime sunlight, whereas an F11 light source (TL84) called three-wavelength white is a light source having a steep peak wavelength and is thus known as a light source likely to cause metamerism.

In the present specification, "metamerism of a recorded product to be obtained is reduced" means that the degree of a color change perceived when an illumination condition changes is low. Orange in particular has absorption of yellow and red light and is likely to cause metamerism depending on the light source, and when the compound A is used as an orange dye, it may look yellowish by the difference in the light source. To address this, by using the compound A and the compound C in combination, such metamerism can be remedied. As the compound C, Acid Orange 94 can also be used.

(3)

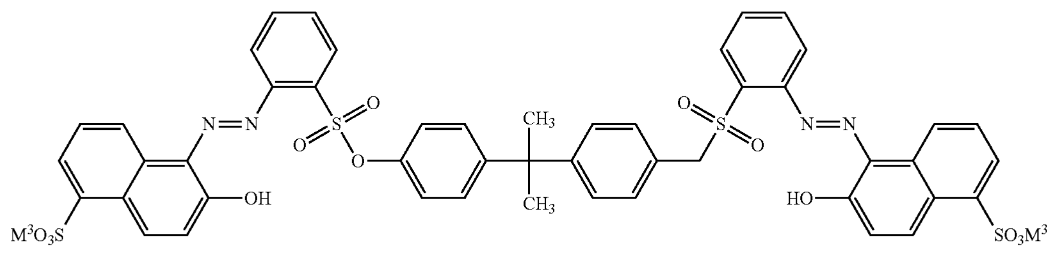

wherein $M^3$ each independently indicate Li, Na, K, or $NH_4$.

When the ink composition contains the compound C, a mass ratio ((a+b)/c) of a total content (a+b) of the compound A and the compound B to a content c of the compound C is preferably 1.0 or more and 15 or less. The mass ratio ((a+b)/c) being within the above range shows a tendency to reduce metamerism of a recorded product to be obtained. From the same point of view, the mass ratio ((a+b)/c) is preferably 3.0 or more and 12 or less, more preferably 4.0 or more and 10 or less, and even more preferably 5.0 or more and 9.0 or less.

When the ink composition contains the compound C, the content c of the compound C is preferably 0.1% by mass or more and 10% by mass or less with respect to the total amount of the ink composition. The content c being within the above range shows a tendency to further reduce metamerism of a recorded product to be obtained. From the same point of view, the content c is more preferably 0.3% by mass or more and 5.0% by mass or less and more preferably 0.5% by mass or more and 1.0% by mass or less.

1.2. Water-Soluble Organic Solvent

Examples of the water-soluble organic solvent include, but are not limited to, glycerin; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,3-butanediol, 1,5-pentanediol, and 1,6-hexanediol; glycol monoethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and triethylene glycol monobutyl ether; lactam compounds such as 2-pyrrolidone, N-methyl-2-pyrrolidone, N-ethyl-2-pyrrolidone, and N-(2-hydroxyethyl)-2-pyrrolidone (HEP); and alcohols such as methanol, ethanol, n-propyl alcohol, iso-propyl alcohol, n-butanol, 2-butanol, tert-butanol, iso-butanol, n-pentanol, 2-pentanol, 3-pentanol, and tert-pentanol. The water-soluble organic solvent may be used singly or in combination of two or more.

Among these, the water-soluble organic solvent preferably contains at least one selected from the group consisting of glycerin, glycols, glycol monoethers, and lactam compounds and more preferably contains glycerin, glycols, glycol monoethers, and lactam compounds. Containing the above compounds as the water-soluble organic solvent shows a tendency to improve the water resistance and/or the clogging reliability of the ink composition. From the same point of view, the water-soluble organic solvent preferably contains at least one selected from the group consisting of N-hydroxyethylpyrrolidone (HEP), triethylene glycol monobutyl ether, glycerin, and triethylene glycol and more preferably contains at least N-(2-hydroxyethyl)-2-pyrrolidone (HEP).

The ink composition of the present embodiment contains a lactam compound as the water-soluble organic solvent, and the content of the lactam compound is preferably 1.0% by mass or more and 10% by mass or less with respect to the total amount of the ink composition. The content of the lactam compound being within the above range shows a tendency to improve the water resistance and/or the clogging reliability of the ink composition. From the same point of view, the content of the lactam compound is more preferably 2.0% by mass or more and 9.0% by mass or less and even more preferably 3.0% by mass or more and 8.0% by mass or less with respect to the total amount of the ink composition.

The total content of the water-soluble organic solvent is preferably 10% by mass or more and 50% by mass or less, more preferably 15% by mass or more and 40% by mass or less, and even more preferably 20% by mass or more and 35% by mass or less with respect to the total amount of the ink composition. The total content of the water-soluble organic solvent being within the above range shows a tendency to improve the water resistance and/or the clogging reliability of the ink composition.

1.3. Water

The ink composition of the present embodiment contains water. Examples of the water include ion exchanged water, ultrafiltrated water, reverse osmosis water, pure water such as distilled water, and ultrapure water.

From the viewpoint of producing the effect of the present disclosure more surely, the content of the water is preferably 30% by mass or more and 95% by mass or less, more preferably 40% by mass or more and 90% by mass or less, even more preferably 50% by mass or more and 80% by mass or less, and still even more preferably 55% by mass or more and 75% by mass or less with respect to the total amount of the ink composition.

1.4. Surfactant

The ink composition may contain a surfactant. Examples of the surfactant include, but are not limited to, acetylene glycol-based surfactants, fluorine-based surfactants, and silicone-based surfactants. From the viewpoint of producing the effect of the present disclosure more surely, the acetylene glycol-based surfactants are preferably used as the surfactant. The surfactant may be used alone or in combination of two or more.

Examples of the acetylene glycol-based surfactants include, but are not limited to, 2,4,7,9-tetramethyl-5-decyne-4,7-diol and alkylene oxide adducts of 2,4,7,9-tetramethyl-5-decyne-4,7-diol and 2,4-dimethyl-5-decyne-4-ol and alkylene oxide adducts of 2,4-dimethyl-5-decyne-4-ol.

Examples of the fluorine-based surfactants include, but are not limited to, perfluoroalkyl sulfonates, perfluoroalkyl carbonates, perfluoroalkyl phosphates, perfluoroalkyl ethylene oxide adducts, perfluoroalkyl betaines, and perfluoroalkyl amine oxide compounds.

Examples of the silicone-based surfactants include polysiloxane-based compounds and polyether-modified organosiloxane.

The content of the surfactant is preferably 0.1% by mass or more and 3.0% by mass or less, more preferably 0.2% by mass or more and 2.0% by mass or less, and even more preferably 0.3% by mass or more and 1.0% by mass or less with respect to the total amount of the ink composition. The content of the surfactant being within the above range produces the effect of the present disclosure more surely.

1.5. pH Adjusting Agent

The ink composition may contain a pH adjusting agent. Examples of the pH adjusting agent include, but are not limited to, inorganic acids (such as sulfuric acid, hydrochloric acid, and nitric acid), inorganic bases (such as lithium hydroxide, sodium hydroxide, potassium hydroxide, and ammonia), organic bases (such as triethanolamine, diethanolamine, monoethanolamine, and triisopropanolamine), and organic acids (such as adipic acid, citric acid, and succinic acid). From the viewpoint of producing the effect of the present disclosure more surely, the pH adjusting agent preferably contains triisopropanolamine. The pH adjusting agent may be used alone or in combination of two or more.

The content of the pH adjusting agent is preferably 0.05% by mass or more and 5.0% by mass or less, more preferably 0.10% by mass or more and 3.0% by mass or less, and even more preferably 0.15% by mass or more and 2.0% by mass or less with respect to the total amount of the ink composition. When the content of the pH adjusting agent is within the above range, the effect of the present disclosure is produced more surely.

1.6. Antiseptic

The ink composition may contain an antiseptic. Examples of the antiseptic include Proxel CRL, Proxel BDN, Proxel GXL, Proxel XL-2, Proxel IB, and Proxel TN. From the viewpoint of producing the effect of the present disclosure more surely, Proxel XL-2 is preferably used as the antiseptic. The antiseptic may be used alone or in combination of two or more.

The content of the antiseptic is preferably 0.05% by mass or more and 5.0% by mass or less, more preferably 0.1% by mass or more and 3.0% by mass or less, and even more preferably 0.2% by mass or more and 2.0% by mass or less with respect to the total amount of the ink composition. When the content of the antiseptic is within the above range, the effect of the present disclosure is produced more surely.

1.7. Chelating Agent

The ink composition may contain a chelating agent. The chelating agent has the property of capturing ions. Examples of the chelating agent include, but are not limited to, ethylenediaminetetraacetic acid or salts thereof (such as disodium ethylenediaminetetraacetate dihydrate), 3-hydroxy-2,2'-iminodisuccinic acid or salts thereof (such as tetrasodium 3-hydroxy-2,2'-iminodisuccinate), and iminodisuccinic acid or salts thereof (such as tetrasodium iminodisuccinate). From the viewpoint of producing the effect of the present disclosure more surely, disodium ethylenediaminetetraacetate dihydrate is preferably used as the chelating agent.

The content of the chelating agent is preferably 0.001% by mass or more and 1.0% by mass or less, more preferably 0.005% by mass or more and 0.5% by mass or less, and even more preferably 0.008% by mass or more and 0.1% by mass or less with respect to the total amount of the ink composition. When the content of the chelating agent is within the above range, the effect of the present disclosure is produced more surely.

1.8. Other Additives

The ink composition may contain various additives that can be used for normal inks, such as fungicides, antioxidants, UV absorbers, oxygen absorbers, and dissolution aids, as needed. The various additives may be used alone or in combination of two or more.

1.9. Method for Producing Ink Composition for Printing

Examples of the method for producing the ink composition for printing of the present embodiment include, but are not limited to, a method of mixing together the compound A, the compound B, the water-soluble organic solvent, the water, and other components as needed.

2. Method of Printing

The method for applying the ink composition for printing is not particularly limited so long as it is a method capable of causing the ink composition of the present embodiment to adhere to a medium to be dyed, and known methods of printing may be used. Examples of the method include a method of printing including a processing liquid adhesion step of causing a processing liquid composition to adhere to a fabric and a printing ink adhesion step of causing the ink composition for printing to adhere to the fabric to which the processing liquid composition has adhered.

2.1. Processing Liquid Adhesion Step

The processing liquid adhesion step is a step of causing the processing liquid composition to adhere to the fabric. Examples of the method for causing the processing liquid composition to adhere to the fabric include, but are not limited to, the padding method of squeezing a fabric impregnated with the processing liquid composition with rollers or the like to impregnate the fabric with the processing liquid composition, a method of spraying the processing liquid composition to a fabric with a spray, and a method of causing the processing liquid composition to adhere to a fabric by the ink jet method.

The processing liquid contains a polyvalent metal salt or a cationic polymer and water and may contain other components as needed. The polyvalent metal salt or the cationic polymer acts as a coagulant for the ink composition for printing and can produce a recorded product having excellent color developing properties.

2.2. Printing Ink Adhesion Step

The printing ink adhesion step is a step of ejecting the ink composition for printing from an ink jet head to the fabric to which the processing liquid composition has adhered and causing the ink composition for printing to adhere to the fabric. Specifically, a pressure generating unit provided inside the ink jet head is driven to eject the ink composition for ink jet printing that fills a pressure generating chamber of the ink jet head from nozzles. Such a method of ejection is also referred to as the ink jet method. One ink composition may be caused to adhere to the same area of the fabric, or a step of causing two or more ink compositions to adhere thereto once or separately a plurality of times may be included.

The printing ink adhesion step may be performed simultaneously with the processing liquid adhesion step. That is, these steps may be performed in such a manner that the processing liquid composition and the ink composition are caused to adhere to the same scanning area of the fabric by the same main scanning.

When the ink composition is caused to adhere to a recording face by an ink jet recording apparatus, the ink jet recording apparatus to be used is not particularly limited, and either a serial type ink jet recording apparatus or a line type ink jet recording apparatus can be used. As an example of the ink jet recording apparatus, FIGURE illustrates a perspective view of a serial type recording apparatus. As illustrated in FIGURE, a serial type recording apparatus 10 includes a transporting portion 120 and a recording portion 130. The transporting portion 120 transports a recording medium F fed to the serial type recording apparatus to the recording portion 130 and discharges the recording medium after recording to the outside of the serial type recording apparatus. Specifically, the transporting portion 120 has feeding rollers and transports the fed recording medium F in a sub-scanning direction T1.

The recording portion 130 of the recording apparatus includes a carriage 134 carrying an ink jet head 131 having nozzles ejecting the ink compositions to the recording medium F fed from the transporting portion 120 and a carriage moving mechanism 135 moving the carriage 134 in main scanning directions S1 and S2 of the recording medium F. The recording medium F may be a medium to be dyed or an intermediate transfer medium.

The recording portion 130 of the recording apparatus has nozzles ejecting the ink composition.

The serial type recording apparatus includes, as the ink jet head 131, a head having a length shorter than the width of the recoding medium, and the head moves to perform recording through a plurality of passes (multi-pass). In the serial type recording apparatus, the carriage 134 moving in a certain direction carries the head 131, and the head moves along with the movement of the carriage to eject the ink composition onto the recording medium. This operation achieves adhesion through two or more passes (multi-pass). The pass is also referred to as main scanning. In an interval between a pass and another pass, sub-scanning for transporting the recording medium is performed. That is, the main scanning and the sub-scanning are alternately performed.

EXAMPLES

The following describes the present disclosure more specifically using examples and comparative examples. The present disclosure is not limited by the following examples at all.

1. Production of Printed Product

1.1. Preparation of Ink Composition

So as to give compositions listed in Tables 1 to 3, the components were put into a tank for a mixture, were mixed together and stirred, and were filtered with a 10 μm membrane filter to obtain an ink jet ink composition of each example. The value of each component indicated in each example in the tables is represented in terms of % by mass unless otherwise specified. In the tables, the values of the pH adjusting agent and the chelating agent are represented in terms of % by mass of their solid content.

The abbreviations and the details of the product components used in Tables 1 to 3 are as follows.

Dye

Compound A (able to be obtained by the method described in Synthesis of Compound A below.)

Synthesis of Compound A

The coloring material (dye) represented by the compound A can be obtained by the following method.

While maintaining 4,4'-diaminodiphenyl cyclohexane hydrochloride at 10° C. or less, an aqueous sodium nitrate solution was added thereto to obtain a diazo compound. Subsequently, conjugation of the obtained diazo compound and 2-naphthol-6,8-disulfonic acid in an amount by mole the same as that of 4,4'-diaminodiphenyl cyclohexane hydrochloride was performed. Next, phenol was added thereto to be reacted at 0 to 3° C. for 1 hour, and then sodium carbonate was added thereto to continue the reaction for 10 hours until pH=10. The reaction product was filtered out, hot water was added thereto to dissolve it, potassium carbonate was added thereto to produce a salt, which was filtered at a high temperature, and then the salt produced by ultrafiltration was removed and dried to obtain the compound A. In the production of the compound A, purification removing by-products such as a compound without 2-naphthol-6,8-disulfonic acid added and a compound with two 2-naphthol-6,8-disulfonic acids added was performed by a preparative high-performance liquid chromatography purification method. The compound A is the potassium salt compound represented by Formula (1).

Compound B (able to be obtained by the method described in Synthesis of Compound B below.)

Synthesis of Compound B

The coloring material (dye) represented by the compound B can be obtained by the following method.

While maintaining 4,4'-diaminodiphenyl cyclohexane hydrochloride at 10° C. or less, an aqueous sodium nitrate solution was added thereto to obtain a diazo compound. Subsequently, conjugation of the obtained diazo compound and 2-naphthol-6,8-disulfonic acid in an amount by mole double that of 4,4'-diaminodiphenyl cyclohexane hydrochloride was performed to the end point. The reaction product was filtered out, hot water was added thereto to dissolve it, potassium carbonate was added thereto to produce a salt, which was filtered at a high temperature, and then the salt produced by ultrafiltration was removed and dried to obtain the compound B. In the production of the compound B, purification removing by-products such as a compound without 2-naphthol-6,8-disulfonic acid added and a compound with one 2-naphthol-6,8-disulfonic acid added was performed by a preparative high-performance liquid chromatography purification method. The compound B is the potassium salt compound represented by Formula (2).

Compound C (Acid Orange 94)

Water-Soluble Organic Solvent

HEP (N-(2-hydroxyethyl)-2-pyrrolidone)

TEGmBE (triethylene glycol monobutyl ether)

Glycerin

Triethylene glycol

Surfactant

Olfine PD002W (product name, an acetylene glycol-based surfactant, manufactured by Nissin Chemical Co., Ltd.)

pH Adjusting Agent

Tripropanolamine

Antiseptic

Proxel XL-2 (benzothiazolin-3-one manufactured by S. C. Johnson & Son, Inc.)

Chelating Agent

EDTA (disodium ethylenediaminetetraacetate dihydrate)

1.2 'Preparation of Processing Liquid

Mixed well together were 5 parts by mass of polyoxyethylene diisopropyl ether (oxyethylene=30 mol), 5 parts by mass of etherified carboxymethyl cellulose, 100 parts by mass of urea, and 10 parts by mass of sodium m-benzene sulfonate, which were then stirred at 60° C. for 30 minutes while adding 1000 parts by mass of ion exchanged water thereto separately in small amounts. Subsequently, 30 parts by mass of sodium carbonate was further added to the solution being stirred, which was stirred for 10 minutes, and this solution was filtered with a membrane filter with a pore diameter of 10 μm to obtain a processing liquid.

1.3. Method of Printing

The processing liquid obtained as described above was applied to a fabric, which was squeezed with a mangle with a pick-up rate of 20% and was dried. Next, a cartridge of an ink jet printer (product name "PX-G930" manufactured by Seiko Epson Corporation) was filled with each ink composition prepared in the above. Using the printer, each ink composition was caused to adhere to the fabric (silk 100%; a basis weight of 90 $g/m^2$) preprocessed with the processing liquid prepared above to record an image. The image was formed on the fabric with a solid pattern with a printing resolution of 720×720 dpi and an ejection duty of 100% to produce a printed product.

Steaming was performed on the fabric with the image printed at 100° C. for 20 minutes, which was then washed at 55° C. for 10 minutes using an aqueous solution containing 0.2 parts by mass of Laccol STA (a surfactant with the product name manufactured by Meisei Chemical Works, Ltd.) and was dried to obtain a printed product. The "solid pattern" means a pattern obtained by recording dots for all pixels, each pixel being a minimum recording unit area specified by recording resolution.

2. Method of Evaluation 2.1. Water Resistance

A water resistance test was conducted for each obtained printed product in accordance with the method described in JIS L 0846: 2004. As to the attached white cloth used for the test, the first attached white cloth and the second attached white cloth were the same cloth, for which cotton (3-3) described in JIS L 0803 was used. These pieces of attached white cloth were purchased from Japanese Standards Association. A grade was evaluated based on Article 10 a) Visual Method of JIS L 0801, and the water resistance was evaluated based on the following criteria. Tables 1 to 3 list evaluation results based on the following criteria. The water resistance of B or higher was determined to be good.

Criteria

A: The water resistance is Grade 4 or higher.

B: The water resistance is Grade 3 or higher and less than Grade 4.

C: The water resistance is Grade 2 or higher and less than Grade 3.

D: The water resistance is less than Grade 2.

2.2. Clogging Reliability

The produced ink composition for ink jet printing of each example was charged into a head entire row of an ink jet printer (product name "PX-G930" manufactured by Seiko Epson Corporation), and it was confirmed that the entire row properly ejected the ink composition for ink jet printing. Subsequently, the recording head was shifted from a standby position to be stopped in a printing area and was left at rest for 14 days in a 40° C., 20% RH environment. After being left at rest, the recording head was returned to the standby position, a cleaning operation was performed, and the number of times of cleaning required until ejection was restored was counted. Tables 1 to 3 list evaluation results based on the following criteria. The clogging reliability of D or higher was determined to be good.

Criteria

A: All the nozzles were restored by one-time or less cleaning.

B: All the nozzles were restored by two-time or more and three-time or less cleaning.

C: All the nozzles were restored by four-time or more and five-time or less cleaning.

D: All the nozzles were restored by six-time or more and nine-time or less cleaning.

E: Some nozzles were not restored even by ten-time cleaning.

2.3. Metamerism

Method of Evaluation

The fabric printed with each ink composition is illuminated with illumination of a D65 light source and illumination of an F11 light source in order, and the occurrence of metamerism caused by the difference in the light source is visually observed.

Criteria

A: Even when the printed fabric is illuminated with illumination of the D65 light source and illumination of the F11 light source, which are compared with each other by visual observation, almost no metamerism is observed.

B: When the printed fabric is illuminated with illumination of the D65 light source and illumination of the F11 light source, which are compared with each other by visual observation, a slight hue difference (metamerism) is observed.

C: When the fabric printed with each ink is illuminated with illumination of the D65 light source and illumination of the F11 light source, which are compared with each other by visual observation, a hue difference (metamerism) is observed, which is at a permissible level.

D: When the fabric printed with each ink is illuminated with illumination of the D65 light source and illumination of the F11 light source, which are compared with each other by visual observation, a hue difference (metamerism) is observed, which is at an impermissible level.

2.4. Lightfastness

Using a Xenon lightfastness testing machine (product name "XL-75s" manufactured by Suga Test Instruments Co., Ltd.), under a condition of 23° C., a relative humidity of 50% RH, and an illuminance of 70000 lux, the printed product of each example was exposed for 10 days. For the hue of the sample before and after exposure, L*, a*, and b* values of each printed product were measured using a spectral densitometer (product name "Spectrolino" manufactured by X-RITE, Inc.) and under a condition of light source: D65, status: DIN_NB, viewing angle: 10 degrees, and filter: UV, a hue difference (ΔE*) of the printed product before and after printing (initial and 10th day) was calculated based on the following expressions, and the lightfastness was evaluated based on the following criteria.

$$\Delta E^*=\{(\Delta L^*)^2+(\Delta a^*)^2+(\Delta b^*)^2\}^{1/2} \quad \text{(Expression 2)}$$

$$\Delta L^*=L^*_1-L^*_2 \quad \text{(Expression 3)}$$

$$\Delta a^*=a^*_1-a^*_2 \quad \text{(Expression 4)}$$

$$\Delta b^*=b^*_1-b^*_2 \quad \text{(Expression 5)}$$

wherein $L^*_1$, $a^*_1$, and $b^*_1$ indicate the measured values of the initial printed product and $L^*_2$, $a^*_2$, and $b^*_2$ indicate the measured values after being exposed for 10 days. Tables 1 to 3 list evaluation results based on the following criteria.

Criteria
A: ΔE* is less than 10.
B: ΔE* is 10 or more and less than 12.5.
C: ΔE* is 12.5 or more and less than 15.
D: ΔE* is 15 or more and less than 17.5
E: ΔE* is 17.5 or more.

TABLE 1

| Ink composition for ink jet printing | | Example 1 | Example 2 | Example 3 | Example 4 | Example 5 | Example 6 | Example 7 |
|---|---|---|---|---|---|---|---|---|
| Dye | Compound A of formula (1) | 3.0 | 3.9 | 4.0 | 2.6 | 3.4 | 3.5 | 3.2 |
| | Compound B of formula (2) | 3.0 | 2.1 | 2.0 | 2.6 | 1.8 | 1.9 | 1.0 |
| | Compound C of formula (3) | 0.0 | 0.0 | 0.0 | 0.8 | 0.8 | 0.6 | 1.0 |
| Water-soluble organic solvent | HEP | 5 | 5 | 5 | 5 | 5 | 5 | 5 |
| | TEGmBE | 5 | 5 | 5 | 5 | 5 | 5 | 5 |
| | Glycerin | 6 | 6 | 6 | 6 | 6 | 6 | 6 |
| | Triethylene glycol | 10 | 10 | 10 | 10 | 10 | 10 | 10 |
| Surfactant | Olfine PD002W | 0.5 | 0.5 | 0.5 | 0.5 | 0.5 | 0.5 | 0.5 |
| pH adjusting agent | Tripropanolamine | 0.2 | 0.2 | 0.2 | 0.2 | 0.2 | 0.2 | 0.2 |
| Antiseptic | Proxel XL-2 | 0.3 | 0.3 | 0.3 | 0.3 | 0.3 | 0.3 | 0.3 |
| Chelating agent | EDTA | 0.01 | 0.01 | 0.01 | 0.01 | 0.01 | 0.01 | 0.01 |
| Water | Ion exchanged water | Remainder | Remainder | Remainder | Remainder | Remainder | Remainder | Remainder |
| | Total | 100 | 100 | 100 | 100 | 100 | 100 | 100 |
| Mass ratio | a/b | 1.0 | 1.9 | 2.0 | 1.0 | 1.9 | 1.8 | 3.2 |
| | (a + b)/c | — | — | — | 6.5 | 6.5 | 9.0 | 4.2 |
| Evaluation | Water resistance | B | A | A | B | A | A | A |
| | Clogging reliability | A | A | A | A | A | A | A |
| | Metamerism | C | C | C | A | A | B | D |
| | Lightfastness | A | A | B | A | A | A | B |

TABLE 2

| Ink composition for ink jet printing | | Example 8 | Example 9 | Example 10 | Example 11 | Example 12 | Example 13 | Example 14 |
|---|---|---|---|---|---|---|---|---|
| Dye | Compound A of formula (1) | 5.9 | 9.9 | 3.5 | 3.0 | 3.0 | 3.0 | 3.0 |
| | Compound B of formula (2) | 0.1 | 0.1 | 1.9 | 3.0 | 3.0 | 3.0 | 3.0 |
| | Compound C of formula (3) | 0.0 | 0.0 | 0.5 | 0.0 | 0.0 | 0.0 | 0.0 |
| Water-soluble organic solvent | HEP | 5 | 5 | 5 | 1 | 10 | 3 | 0 |
| | TEGmBE | 5 | 5 | 5 | 5 | 5 | 5 | 5 |
| | Glycerin | 6 | 6 | 6 | 6 | 6 | 6 | 6 |
| | Triethylene glycol | 10 | 10 | 10 | 10 | 10 | 10 | 10 |
| Surfactant | Olfine PD002W | 0.5 | 0.5 | 0.5 | 0.5 | 0.5 | 0.5 | 0.5 |
| pH adjusting agent | Tripropanolamine | 0.2 | 0.2 | 0.2 | 0.2 | 0.2 | 0.2 | 0.2 |
| Antiseptic | Proxel XL-2 | 0.3 | 0.3 | 0.3 | 0.3 | 0.3 | 0.3 | 0.3 |
| Chelating agent | EDTA | 0.01 | 0.01 | 0.01 | 0.01 | 0.01 | 0.01 | 0.01 |
| Water | Ion exchanged water | Remainder | Remainder | Remainder | Remainder | Remainder | Remainder | Remainder |
| | Total | 100 | 100 | 100 | 100 | 100 | 100 | 100 |
| Mass ratio | a/b | 59.0 | 99.0 | 1.8 | 1.0 | 1.0 | 1.0 | 1.0 |
| | (a + b)/c | — | — | 10.8 | — | — | — | — |
| Evaluation | Water resistance | A | A | A | B | B | B | B |
| | Clogging reliability | C | D | A | C | A | B | D |
| | Metamerism | C | C | C | C | C | C | C |
| | Lightfastness | B | B | A | A | A | A | A |

TABLE 3

| Ink composition for ink jet printing | | Comparative example 1 | Comparative example 2 | Comparative example 3 | Comparative example 4 |
|---|---|---|---|---|---|
| Dye | Compound A of formula (1) | 0.0 | 2.9 | 6.0 | 11.0 |
| | Compound B of formula (2) | 6.0 | 3.1 | 0.0 | 0.1 |
| | Compound C of formula (3) | 0.0 | 0.0 | 0.0 | 22.2 |
| Water-soluble organic solvent | HEP | 5 | 5 | 0 | 5 |
| | TEGmBE | 5 | 5 | 5 | 5 |
| | Glycerin | 6 | 6 | 6 | 6 |
| | Triethylene glycol | 10 | 10 | 10 | 10 |
| Surfactant | Olfine PD002W | 0.5 | 0.5 | 0.5 | 0.5 |
| pH adjusting agent | Tripropanolamine | 0.2 | 0.2 | 0.2 | 0.2 |
| Antiseptic | Proxel XL-2 | 0.3 | 0.3 | 0.3 | 0.3 |
| Chelating agent | EDTA | 0.01 | 0.01 | 0.01 | 0.01 |
| Water | Ion exchanged water | Remainder | Remainder | Remainder | Remainder |
| | Total | 100 | 100 | 100 | 100 |
| Mass ratio | a/b | 0.0 | 0.9 | — | 110.0 |
| | (a + b)/c | — | — | — | 0.5 |
| Evaluation | Water resistance | D | C | A | A |
| | Clogging reliability | A | A | E | E |
| | Metamerism | D | C | C | C |
| | Lightfastness | A | A | B | A |

3. Evaluation Results

Tables 1 to 3 list the compositions and the evaluation results of the inks used in the respective examples. It can be seen from Tables 1 to 3 that the ink compositions for ink jet printing containing the coloring material, the water-soluble organic solvent, and the water, in which the coloring material contains the compound A represented by Formula (1) and the compound B represented by Formula (2) and the mass ratio (a/b) of the content a of the compound A to the content b of the Compound B is 1.0 or more and 99 or less are excellent in both water resistance and clogging reliability.

What is claimed is:

1. An ink composition for ink jet printing, comprising:

a coloring material;

a water-soluble organic solvent; and water, wherein the coloring material contains a compound A represented by Formula (1) and a compound B represented by Formula (2) and a mass ratio (a/b) of a content a of the compound A to a content b of the compound B is 1.0 or more and 99 or less:

(1)

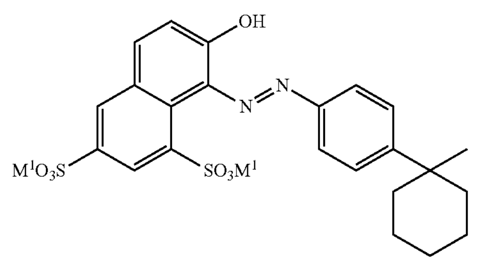

-continued

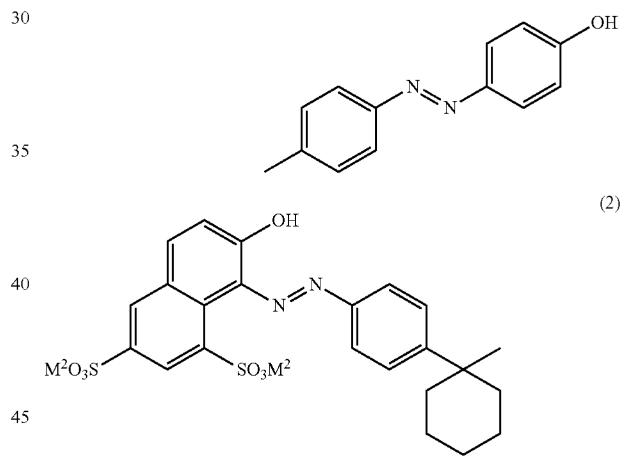

(2)

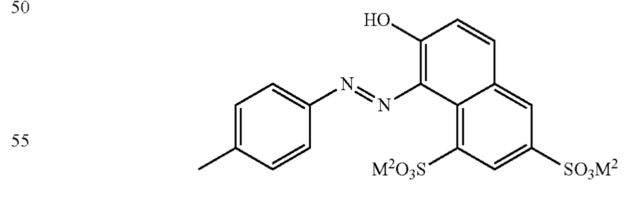

wherein $M^1$ each independently indicate Li, Na, K, or $NH_4$ and $M^2$ each independently indicate Li, Na, K, or $NH_4$.

2. The ink composition for ink jet printing according to claim 1, wherein the mass ratio (a/b) is 1.0 or more and 2.7 or less.

3. The ink composition for ink jet printing according to claim 1, wherein the coloring material contains a compound C represented by Formula (3):

(3)

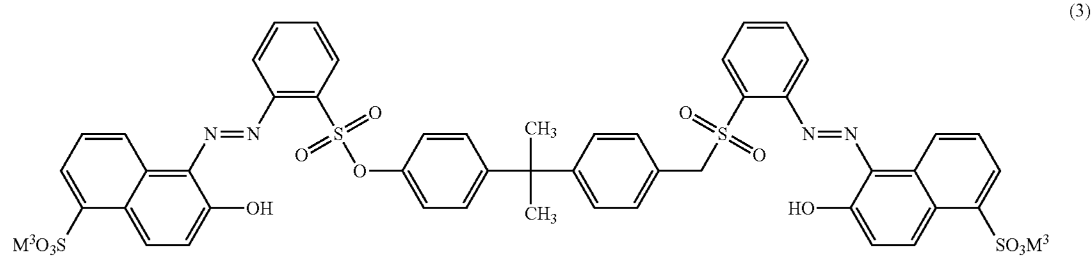

wherein $M^3$ each independently indicate Li, Na, K, or $NH_4$.

4. The ink composition for ink jet printing according to claim 3, wherein a mass ratio ((a+b)/c) of a total content (a+b) of the compound A and the compound B to a content c of the compound C is 5.0 or more and 9.0 or less.

5. The ink composition for ink jet printing according to claim 1, wherein the water-soluble organic solvent contains a lactam compound and a content of the lactam compound is 1.0% by mass or more and 10% by mass or less with respect to a total amount of the ink composition.

6. The ink composition for ink jet printing according to claim 1, wherein the water-soluble organic solvent contains N-hydroxyethylpyrrolidone.

* * * * *